April 23, 1968  MITSUO MATSUI ETAL  3,378,997
METHOD AND APPARATUS FOR MANUFACTURING BULKY
CRIMPED YARN FROM SYNTHETIC RESIN FILMS
Filed Oct. 27, 1966  2 Sheets-Sheet 1

INVENTOR.S
MITSUO MATSUI
CHUJI SHIMIZU
BY Whittemore, Hulbert
& Belknap
ATTORNEYS April 23, 1968    MITSUO MATSUI ET AL    3,378,997
METHOD AND APPARATUS FOR MANUFACTURING BULKY
CRIMPED YARN FROM SYNTHETIC RESIN FILMS
Filed Oct. 27, 1966                              2 Sheets-Sheet 2

INVENTORS
MITSUO MATSUI
CHUJI SHIMIZU
BY
ATTORNEYS

United States Patent Office 3,378,997
Patented Apr. 23, 1968

3,378,997
METHOD AND APPARATUS FOR MANUFACTURING BULKY CRIMPED YARN FROM SYNTHETIC RESIN FILMS
Mitsuo Matsui, 1-1529 Henjo, Tochigi-ken, Ashikaga-shi, Japan, and Chuji Shimizu, 5-89 Minami-cho, Nukui, Kogani-shi, Tokyo-to, Japan
Filed Sept. 27, 1966, Ser. No. 582,320
Claims priority, application Japan, Sept. 28, 1965, 40/59,623
5 Claims. (Cl. 57—34)

The present invention relates to the production of bulky split yarn from films or sheets of synthetic resin or plastic materials. More particularly, it relates to a method and apparatus for producing bulky crimped yarn from reticularly split yarn made from synthetic resin film.

Various methods have been proposed hitherto to produce reticularly split or netlike split yarn from the synthetic resin films. One of such methods involves the steps of first putting stretched film between a pair of elastic belts then extending the width of the belts along its advancement thereby splitting the film at the same time. Another method is characterized by blowing compressed gas stream simultaneously from nozzles positioned both above and below the film to be split. Still another method comprises applying repeated friction, tension or pressure onto the film in a direction perpendicular to the elongation direction of stretched film.

Neither of such prior methods, however, can constantly produce split yarn having uniform property, due to the formation of uneven slits with a variety in their shapes and sizes, because the film is compelled to split by the action of a force applied in a direction perpendicular to that of molecular orientation of the film to form irregularly sized slits. Therefore, bulky yarn obtained from the split yarn usually has a variety in the state of crimp ranging from no crimped to excessively crimped state imparted to the reticulated split yarn.

The object of this invention is to provide a method and apparatus for the production of uniform bulky yarn, whereby uniformly bulked yarn can be produced from split yarn obtained by splitting synthetic resin film with a splitter, and said bulky treatment is continuously carried out in a successive step to the film splitting processs to give uniformly bulked yarn.

Now the object is accomplished in accordance with the method and apparatus of this invention, which method comprises steps of passing continuous synthetic resin film cut in a suitable width between an elastic roll and a splitter placed opposite to the elastic roll thereby splitting the film to form reticularly split fibrous strand, and, with or without giving twist, buckling the yarn by pressing it on a moving belt after passing through a pair of rolls with relatively larger diameters thereby imparting crimp to the fiber, and further heat-treating to set the crimp to give a bulky crimped yarn.

The invention will be more fully described by referring to attached drawings, in which.

Figure 6:
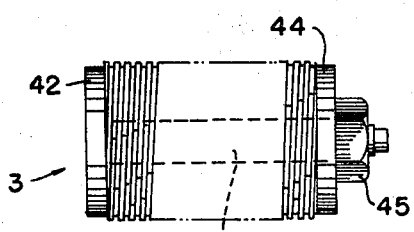
Figure 7:
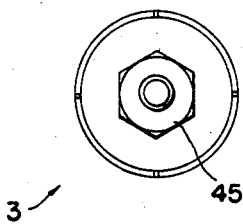
Figure 8:
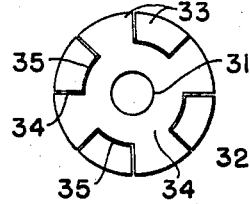
Figure 9:
Figure 10:
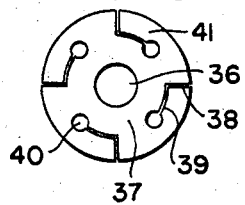
Figure 11:
Figure 12:
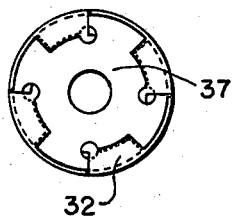

FIG. 6–FIG. 12 illustrate modified type of the film splitter to be used in the practice of this invention, in which FIG. 6 is a front view of an assembled cutter structure composed of a plurality of pairs of combined blade disk and washer member. FIG. 7 is a right side view of the cutter shown in FIG. 6. FIG. 8 is a side view of the blade disk. FIG. 9 is a front view of the blade disk. FIG. 10 is a side view of the washer member. FIG. 11 is a front view of the washer member. FIG. 12 is a side view of a combined pair or blade disk and washer member.

Figure 13:
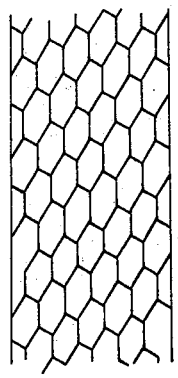

FIG. 13 is a plane view of the sidewardly extended split film, and

Figure 14:

FIG. 14 is a plane view of bulky crimped yarn.

Figure 1:
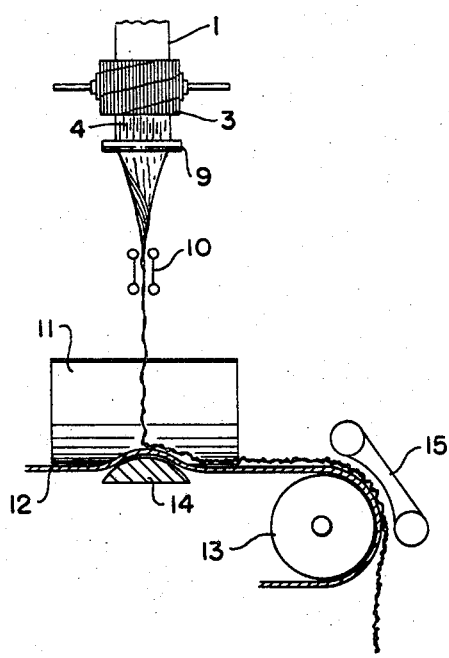
FIG. 1 is a full front view of an apparatus for practicing this invention.
Figure 2:
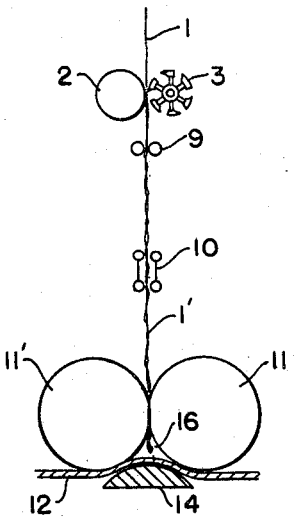
FIG. 2 is a full side view of the apparatus shown in FIG. 1.
Figure 3:
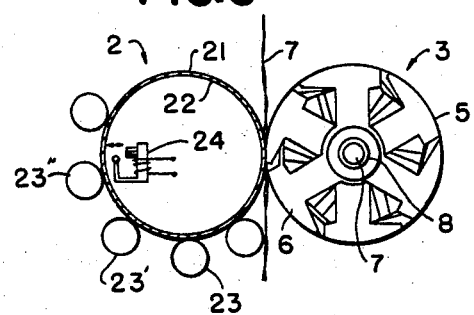
FIG. 3 is a side view, partially in vertical section, of a splitter and elastic press roll used in another embodiment of this invention.

Now, the method and the apparatus of this invention are explained in details below:

A stretched film 1 having suitable width is passed through a splitter 3 placed in an opposite relation to an elastic roll 2 or elastic belt to form a number of slits 4 running along the lengthwise direction of the film. The elastic roll 2 shown in FIG. 2 is made of a solid cylindrical elastic material or may be such type as shown in FIG. 3 in which a cylinder shell 22 is covered on its periphery with a layer of an elastic material 21 and supported in a suitable manner. In this FIG. 3, the roll is supported on a number of outer support rolls 23, 23', 23" ... etc. so as to insure a tight contact with the splitter 3. A fixedly positioned vibrating means 24 may be contained inside the cylinder shell 22 which is suitably an electric vibrator being actuated by alternating or pulse current. The vibration may be applied by any other conventional means such as using cams or hammers to cause mechanical striking or patting action, or using the blow of compressed air and sonic waves etc.

Figure 4:
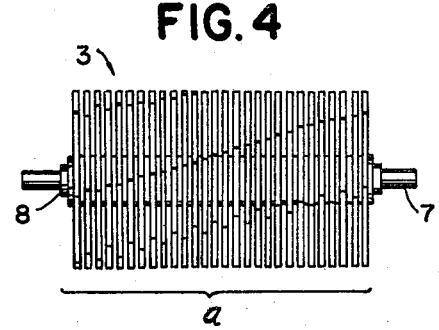
FIG. 4 is a front view of a film splitter.
Figure 5:
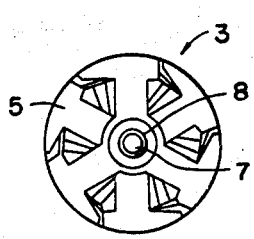
FIG. 5 is a side view of the film splitter shown in FIG. 4.

The splitter 3 is made up, as shown in FIGS. 4 and 5, of a desired number of stacked thin cutter members 6 each having at its periphery several arcuated blade edges 5 and at its center being shafted with a common shaft 7 and fastened thereto with screw nuts 8. The cutter members are fastened in such way that the blade edge 5 of the member is stacked in staggered relation from one another to form spiral edge line along the periphery of the splitter body.

In another embodiment, the splitter may be assembled, as shown in FIGS. 6–12, from a number of combined cutter members comprising a pair of blade disk and washer member. As shown in FIG. 8, the blade disk 32 has at its center a shaft hole 31, and has a plurality of blade edges 33 and notches 34, 35 around its circumference. The notch is formed of a centripetal cut section 34 and successive concentrical cut forming L-shape therewith. The washer member 37, as shown in FIG. 10, has a diameter slightly smaller than that of the blade disk 32, and similarly has at its center a shaft inserting hole 36, and around its circumference are provided with centripetal cuts 38 and successive concentrically arcuated sections 39 each having at its end a round hole 40.

The blade disk and the washer member are then put together in a state shown in FIG. 12 and combined such that the tongue section 41 formed by the cuts 38 and 39 of the washer member engages with centripetal cut 34 of the blade disk to form a combined pair of cutter elements. A desired number of thus combined pairs of cutter elements are then assembled into a splitter 3 by inserting a shaft 43 and flanges 42 and 43 at both ends and by securing with a screw nut 45 at its one end. When the centripetal cuts of the blade disk are arranged in staggered relation from one another, the combined cutter elements inserted to the shaft provide a split roll having a spiral blade line as shown in FIG. 6. However, the elements may be fixed with the shaft to form a linear blade line.

The splitter 3 is pressed against the elastic roll 2 or elastic belt with the film 1 interposed therebetween and rotated at the same speed as the film fed to thereby cut the film at a length equal to that of blade edge 5 of the splitter 3 forming a number of thin slits 4 on the film.

In case a splitter having a staggered blade line is used, the slit given on the film has a length only equal to that of the blade edge of the cutter element so that the slit pattern obtained forms a zigzag line consisting of a number of short slits spaced successively within a small distance from one another. Furthermore, the pattern can be modified with alternating sharp and dull slits by applying a suitable vibration to the elastic roll 2 to give variations in the shape of the slit. When using a stretched film with a larger width, a film cutting means for slitting the film into a suitable width at the same time with splitting may be placed coaxially with the splitter. In this case, the slit film is extended sidewards to form a tortoise shell-like network structure as illustrated in FIG. 13.

The film thus split is then passed through guide rolls 9 to a twister 10 where it is false-twisted into the form of a fibrous strand. The strand is then passed between a pair of rolls 11, 11' which are made of a suitable elastic material and have relatively a larger diameter than other rolls. The strand, as coming out of the rolls 11, 11', buckles while being pressed against the surface of a belt 12 which is running below the rolls in the direction parallel to the roll axis at the speed of the ratio of about 1:6 to the roll speed. After thus being pressed against the belt, the reticular fibrous strand 1' is conveyed by the belt without being compacted or stuffed as in the case of stuffer box process.

There is also provided under the belt 12 and near the contact point of the rolls 11, 11', a belt supporting member 14 which is freely movable upward and downward.

Thus, the reticular fibrous strand 1' is folded in a pile on the belt 12 inside a triangular space 16 formed by the rolls 11, 11' and a section of the belt 12 above the support member 14, then withdrawn by the belt 12 in a folded state. The degree of the buckling of the fibrous strand may be adjusted depending upon the force of the contact pressure of the rolls 11, 11' and the relative position of the belt support member 14 to the rolls, i.e., the depth of the triangular space 16.

Since synthetic resin film has less flexibility or pliability than ordinary fiber materials, the strand made from the split plastic film is formed into a finely crimped wavy yarn when abruptly knocked onto the belt at right angles which causes buckling of the strand from that of the rolls 11, 11' in a direction parallel to the axis of the rolls.

The belt 12 is suitably supported on a support roll 13 having in its interior a suitable heating means, so that the folded reticular strand conveyed on the belt 12 out of the triangular space 16 can be heat-treated when it reaches a location between the support roll 13 and a cover 15 so as to set the fold or bend to form a bulky crimped yarn 1'.

Synthetic resin films to be used for manufacturing bulky crimped yarns of the present invention may be those produced either by melt, dry or wet processes from a variety of kinds of film-forming high molecular polymers including polyethylene, polypropylene, poly(butene-1), poly(pentene-1) and the like polymers of olefins such as 3-methyl-butene-1,4-methyl-pentene-1, and poly(vinyl chloride), polyamides, polyesters, polyacrylonitrile, poly(vinyl alcohol), and other derivatives of above-mentioned polymers, etc.

As is clear from the description hereinabove, the bulky crimped yarn of the invention can be made in a much more inexpensive cost than that of multifilaments.

Moreover, the bulky crimped yarn of this invention can be produced with a much more simplified process whereby the split yarn is formed from the synthetic resin film and by the successive bulking treatment in a single integrated step than prior methods, which usually consist of a plurality of complicated procedures, so that the time and labor work required for the production can be greatly reduced thus improving the productivity to a large extent. Furthermore, it is now possible to manufacture bulky crimped yarn having a quality not inferior to that produced from conventional multi-filaments with a much easier method and high industrial productivity. Besides, yarn having a beautiful and uniform slit pattern is obtainable according to the present invention by arranging the blade edge on the splitter in successively staggered relation as to proximate blades thereby forming on the film 1 slits 4 having a zigzag pattern. It is also possible to form regular inclined cuts along the lengthwise direction of the film, and in addition, possible to obtain a network slits with a tortoise-shell like pattern by operating with the use of a splitter having staggered blade edges as shown in FIG. 6 followed by extending the split film sideways. The film having parallel slits with uniform cut length may also be obtained by using a splitter with blades arranged in linear rows instead of staggered arrangement. Thus the film having particular slits imparted by the use of the splitter of this invention can be effectively worked in a later crimping stage to recreate remarkably excellent fibrillated state. Moreover, it has now become possible to obtain bulky yarn having such excellent crimp with uniform pitch as have not yet been attained in any other processes, for instance, in the so-called stuffer box process. In accordance with the process of this invention a split fiber strand 1' is formed and buckled by the contact with the running belt 12 while being fed by a pair of rolls 11, 11', and withdrawn in a direction parallel to the axis of the rolls, which is effected in concomitance with the uniform reticular slit obtained in the preceding step.

The size of the crimp can be adjusted over a wide range to easily produce a desired shape by suitably raising or lowering the belt support member 14. This also constitutes one of advantageous features of the present invention.

The bulky crimped yarn obtained in accordance with this invention may be utilized in a variety of fields including the manufacture of knitted fabrics, woven fabrics, nonwoven fabrics etc., and also in the manufacture of various apparels including general clothing, sporting wears, foundations, hats, medical supporters, ornamentals etc., and in industrial fields such as for making ropes, fish nets, washing bag, electric wire windings, filter clothes etc. The staple obtained by cutting the crimped yarn of this invention may be used for padding, spun yarn, nonwoven cloth and the like textile materials.

Various modifications and alterations of this invention will become apparent to those skilled in the industry without departing from the scope and spirit of this invention.

What is claimed is:

1. A method for manufacturing a crimped yarn made of split reticulated yarn, which comprises splitting synthetic resin film with a splitter to give uniformly arranged slits on the film, forming said split film into a fibrous strand, then pressing said fibrous strand against a moving belt while passing the strand between a pair of rolls, and withdrawing the fibrous strand therefrom to thereby impart to the strand uniform crimp, and thereafter heat-treating to set the crimp.

2. An apparatus for manufacturing crimped yarn of split recticular fiber made of synthetic resin film, which comprises a pair of an elastic roll and a splitter for cutting the film into a reticulated structure, a false-twisting device, a pair of rolls and an endless belt supported by a belt supporting member placed below the endless belt so as to from therebetween a nearly triangular space, and a heat-treating device placed in succession to the endless belt.

3. An apparatus of claim 2 wherein the splitter placed opposite the elastic roll is constructed from a shaft, a desired number of combined cutter elements each comprising a washer member and a blade disk, the washer member having at its center a shaft inserting hole and at its circumference a centripetal cut followed by a concentrical cut in L-shaped relation, the blade disk having at its center a shaft inserting hole and at its circumference a centripetal cut followed in L shape by a concentrical cut, the washer member and the blade disk being combined in such that the tongue section of the washer member is engaged with the cut of the blade disk, said combined cutter elements being inserted and secured to the shaft.

4. An apparatus of claim 3 wherein the elastic roll placed in opposition to the splitter is minutely vibrated while keeping constant contact with the splitter.

5. An apparatus of claim 2 in which the elastic roll placed opposite the splitter is given repeated minute vibrations.

References Cited
UNITED STATES PATENTS

| | | | |
|---|---|---|---|
| 2,914,810 | 12/1959 | Robinson et al. | 19—66 |
| 2,972,798 | 2/1961 | Stanley et al. | 28—72 |
| 3,146,512 | 9/1964 | Heijms | 28—1 |
| 3,147,533 | 9/1964 | Baer | 28—1 |
| 3,325,987 | 6/1967 | Hollihan et al. | 57—157 XR |

JOHN PETRAKES, *Primary Examiner.*